(12) United States Patent
Kuwano et al.

(10) Patent No.: US 6,747,433 B2
(45) Date of Patent: Jun. 8, 2004

(54) STEPPING MOTOR CONTROLLER

(75) Inventors: Yoshifumi Kuwano, Kiryu (JP); Yukinari Takahashi, Kiryu (JP); Akio Takemori, Kiryu (JP)

(73) Assignee: Japan Servo Co., Ltd., Tokyo (JP)

( * ) Notice: Subject to any disclaimer, the term of this patent is extended or adjusted under 35 U.S.C. 154(b) by 56 days.

(21) Appl. No.: 10/253,581

(22) Filed: Sep. 25, 2002

(65) Prior Publication Data

US 2003/0057911 A1 Mar. 27, 2003

(30) Foreign Application Priority Data

Sep. 26, 2001 (JP) .................................. 2001-293003

(51) Int. Cl.$^7$ ................................................ H02P 8/22
(52) U.S. Cl. ...................................................... 318/685
(58) Field of Search ................................. 318/685, 696, 318/701, 714, 720–724

(56) References Cited

U.S. PATENT DOCUMENTS 5,970,811 A * 10/1999 Imao et al. ..................... 74/335
6,501,243 B1 * 12/2002 Kaneko et al. ............. 318/700
6,670,782 B2 * 12/2003 Kuwano et al. ............. 318/685

FOREIGN PATENT DOCUMENTS

JP           6-225595 A           8/1994

* cited by examiner

*Primary Examiner*—Bentsu Ro
(74) *Attorney, Agent, or Firm*—Birch, Stewart, Kolasch, & Birch LLP

(57) ABSTRACT

The controller comprises current sensors for detecting motor currents, an inverter containing a current control means for feeding currents to motor windings, a coordinate transformer that transforms the motor currents in a fixed coordinates system into currents in a first rotational coordinates system, and an angle calculator that transforms a command pulse into a command angle. A second rotational coordinates system composed of a dp axis and a qp axis perpendicular to the dp axis is determined from the command angle. A command current on the dp axis is set to be a value corresponding to a motor current amplitude and another command current on the qp axis is set to be zero. The motor current is projected on the dp and qp axes and controlled so as to make the components on the dp and qp axes coincide with the respective command currents on the dp and qp axes.

3 Claims, 5 Drawing Sheets

STEPPING MOTOR CONTROLLER

BACKGROUND OF THE INVENTION

1. Field of the Invention

The present invention concerns a stepping motor controller for controlling rotational angular position and rotational speed of a stepping motor.

2. Description of the Prior Art

With the high functionalization of systems equipped with motors, motors of which noise levels and vibration levels are low, and of which rotational speed ranges are wide, are being demanded. A stepping motor has excellent properties such as a small rotational angular position error and a wide rotational speed range. However, the stepping motor is caused to make a stepping rotation by changing instantaneously excitation currents for windings at each time when an external command pulse is given. Accordingly, there have been problems that the stepping motor causes vibration and noise and that it tends to step out when the excitation current is changed.

To solve such problems, a micro-step excitation system in which an inverter of a PWM (pulse width modulation) type is used to smoothly change the excitation current for windings is being generally used.

In the micro-step excitation system being used in general, a current of a sinusoidal wave form is divided to form a plurality of stepped currents with different levels, and the stepped currents are fed to the respective motor windings with a phase difference between according to the number of phases of the motor. Accordingly, it is necessary to control a plurality of phase currents according to the number of phases of the motor. So, the construction of the controller becomes complicated with the increase of the number of phases of the motor.

To simplify the construction of the controller, it is conceived to apply an inverter controller technique that is generally used for controlling an AC servomotor, and in which rotational coordinates system is introduced, to the stepping motor controller. The stepping motor controller to which the inverter controller technique is applied is suitable for realizing a micro step drive of the motor at a high resolution, since a rotational angle can be controlled directly.

As an example of such stepping motor controller, there is a stepping motor controller disclosed in Unexamined Japanese Patent Publication No.6-225595. In this controller, each phase current in a fixed coordinates system is converted into a phase current in a d-q rotational coordinates system in which d axis is in a direction of a magnetic flux and q axis is in a direction perpendicular to the d axis, and the control of the currents are dealt with in the rotational coordinates system. An encoder is connected to a stepping motor, and closed loop control systems for current control, for velocity control and for position control are composed. Each information in the fixed coordinates system is converted into information in the d-q rotational coordinates system to carry out the position control.

Considering a current in the d axis direction to be an exciting current and a current in the q axis direction to be a torque current, a command current in the q axis is varied to generate a torque for rotating the motor, and is varied so as to make the current in the q axis direction minimum when the rotational position of the motor reaches a predetermined position.

To simplify the construction of the controller, a non-interference component is omitted and the command current is given directly on the d or q axis. In this controller, since the rotational position of the motor is controlled so as to make a position detection signal coincide with a position command, a micro step drive of the stepping motor in accordance with the resolution of a position controller and that of a position detector is possible.

In the stepping motor controller disclosed in Unexamined Japanese Patent Publication No.6-225595, the position detection signal detected by the position detector is used for controlling rotational angle of the motor. That is, a motor current is converted into a current in the d-q rotational coordinates system in which the d axis is in a direction of the magnetic flux and the q axis is in a direction perpendicular to the d axis, using the position detection signal detected by the position detector. The control in the stepping motor controller is a closed loop position control using the position detection signal detected by the position detector.

Further, a current perpendicular to the magnetic flux, that is, a current in the direction of the q axis, is controlled according to a velocity deviation to control the torque to be generated. Accordingly, the position controller and a velocity controller are required to be provided to effectuate the position control.

Thus, there is a problem that the construction of the stepping motor controller such as disclosed in Unexamined Japanese Patent Publication No.6-225595 is complicated, and consequently, expensive.

SUMMARY OF THE INVENTION

It is an object of the present invention to provide a stepping motor controller having a simple construction, low in price and having a micro step drive function with high degree of accuracy.

In order to achieve the above object, the present invention provides a stepping motor controller comprising;

- current sensors that detect respective motor currents of corresponding phases,
- an inverter containing a current control means for feeding stepped currents to motor windings,
- a coordinate transformer that transforms the motor currents in a fixed coordinates system detected by the current sensors into currents in a first rotational coordinates system composed of a d axis being in the direction of a magnetic flux direction and a q axis being perpendicular to the d axis,
- an angle calculator that transforms an external command pulse for causing the motor to make a stepping rotation into a command angle,
- wherein a second rotational coordinates system composed of a dp axis and a qp axis being perpendicular to the dp axis is determined from the command angle,
- a command current on the dp axis is set to be a value corresponding to a motor current amplitude,
- another command current on the qp axis is set to be zero,
- the motor current is projected on the dp axis and the qp axis,
- the motor current is controlled so as to make a component of the motor current on the dp axis coincide with the command current on the dp axis and to make a component on the qp axis coincide with another command current on the qp axis, and
- the motor is caused to make a stepping rotation by rotating the second rotational coordinates system by a predetermined angle at each time when the external command pulse is applied.

In the stepping motor controller according to the present invention, the value corresponding to the motor current amplitude is set on the dp axis as the command current, whereas zero current value is set on the qp axis as another command current. As a result, the q axis component of the current value appears due to the angle difference between a rotor angle and the command angle, and a torque is generated. Accordingly, an operation for controlling the q axis current according to the rotor angle or the generated torque is not required. Consequently, the stepping motor controller having a simple construction, low in price and having a micro step drive function with high degree of accuracy can be provided.

DETAILED DESCRIPTION OF THE INVENTION

First, the principle of the present invention is explained.

Figure 1:
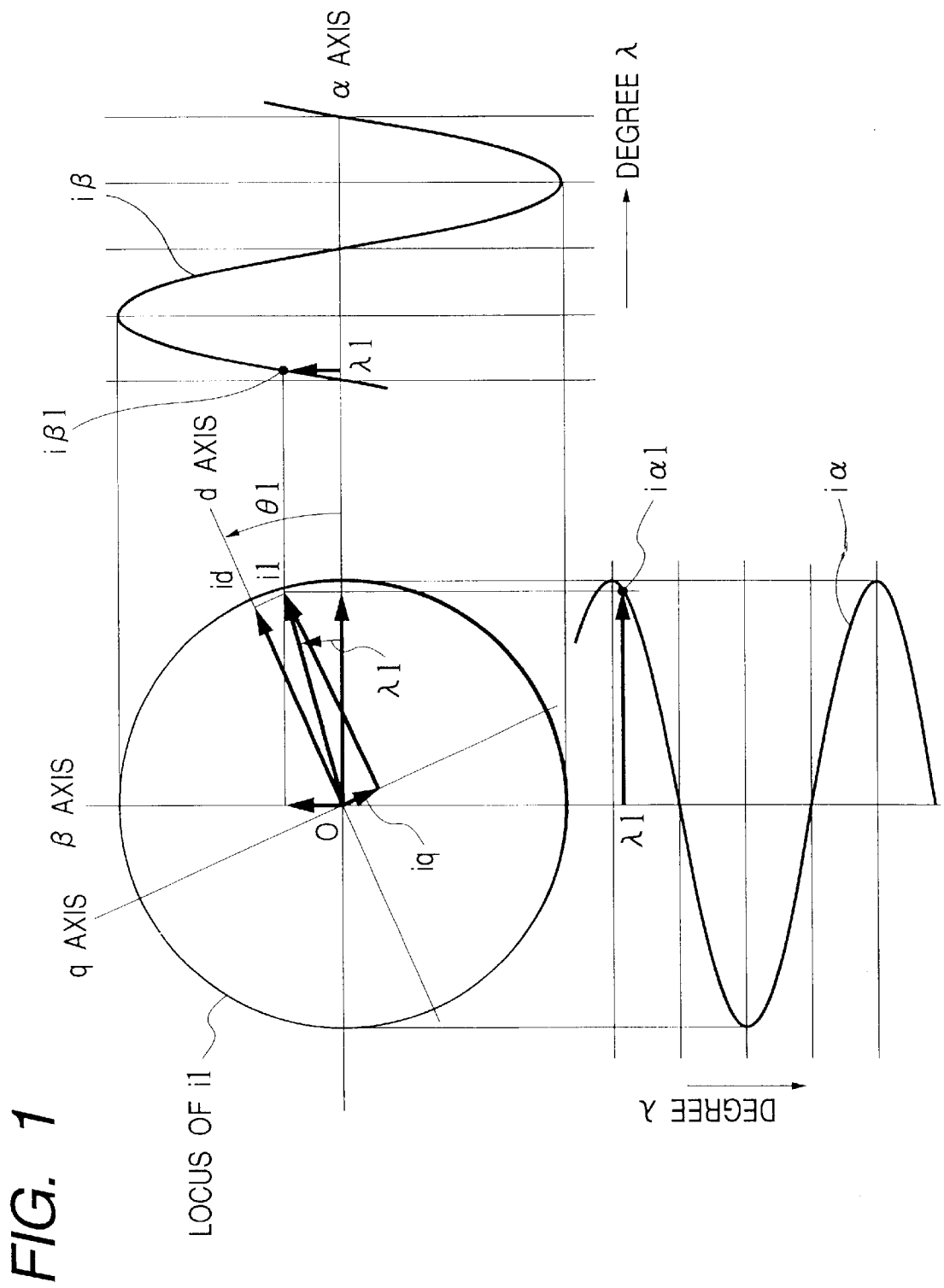
FIG. 1 is a diagram showing the relation between a fixed coordinates system and a rotational coordinates system.

FIG. 1 is a vector diagram showing the relation between a two-phase $\alpha$-$\beta$ fixed coordinates system and a d-q rotational coordinates system.

Referring to FIG. 1, a current $i\alpha$ and a current $i\beta$ both of sinusoidal wave form and having a phase difference of 90° in electrical angle between them are fed to an A-phase motor winding and a B-phase motor winding respectively to carry out a micro step drive. Assuming that, at an angle $\lambda=\lambda 1$, a value of the current $i\alpha$ is $i\alpha 1$ and a value of the current $i\beta$ is $i\beta 1$, a resultant current vector i1 rotated by an angle $\lambda=\lambda 1$ from the $\alpha$ axis is obtained in the rotational coordinates system.

Assuming that, at an occasion that an angle between the direction of a magnetic flux of the rotor and the $\alpha$ axis is $\theta 1$ (this angle is also called a rotor angle), that an axis of the rotational coordinates in the direction of the magnetic flux of the rotor is a d axis, and that an axis of rotational coordinates perpendicular to the d axis is a q axis, the d axis and the q axis are in the directions rotated by $\theta 1$ from the $\alpha$ axis and the $\beta$ axis, respectively. The components of the resultant current vector i1 in the d-q rotational coordinates system are a current id and a current iq that are obtained by projecting the resultant current vector i1 on the d axis or on the q axis, respectively.

As commonly known, a motor torque is caused by a vector product of a magnetic flux and a current. Accordingly, if the current iq perpendicular to the magnetic flux has non-zero value, then the motor has a rotational force. Therefore, if the direction of the resultant current vector i1 does not coincide with the d axis as shown in FIG. 1, then a q axis component of the resultant current vector i1 appears and a torque is generated in the motor.

Figure 2:
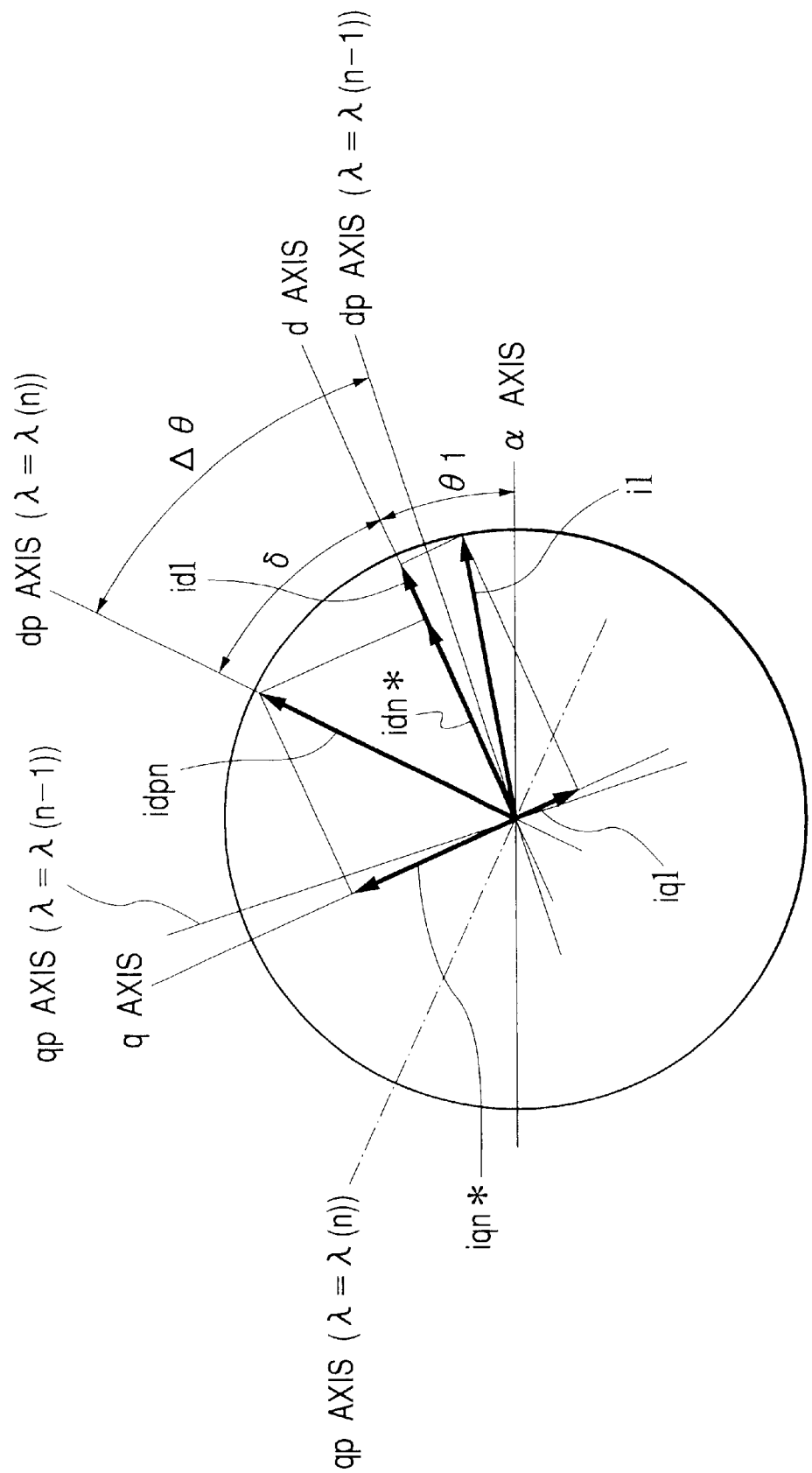
FIG. 2 is a diagram showing the relation between a dp-qp rotational coordinates system and a d-q rotational coordinates system.

FIG. 2 is a vector diagram for explaining the operation of the present invention and showing the relation between a dp-qp rotational coordinates system that is a second rotational coordinates system and the d-q rotational coordinates system that is a first rotational coordinates system. The d axis and the q axis in FIG. 2 are similar to those in FIG. 1.

An angle between the d axis and the $\alpha$ axis at a time (n−1) is assumed to be $\theta 1$. At a time n when a next command pulse is applied, the dp axis and the qp axis of the second rotational coordinates system that are obtained by further rotating instantaneously the d axis and the q axis by an angle of $\delta$, respectively, are generated from a command pulse train, and a command current idpn of which magnitude is equal to i1 is given on the dp axis. Angle between the $\alpha$ axis and the dp axis is called a command angle.

Additionally, the position of the dp axis at the time (n−1) is situated nearer to the $\alpha$ axis than that at the time n by a step angle $\Delta\theta$ that is a rotational angle per one(1) pulse. That is, the dp-qp axis is rotated by the step angle $\Delta\theta$ at each time when one(1) command pulse is applied.

At an instant of the time n when the command pulse is applied, the command current idpn is flowing, and the d axis and the dp axis have an angle difference $\delta$ between them. Therefore, d axis component idn* and q axis component iqn* of the command current idpn appear.

Thus, angle difference between the dp axis and the d axis increases at each time when the command pulse is applied, the q axis component of the command current on the dp axis appears, the torque increases, and the motor is rotated. By controlling the command current to coincide with a detected current, the motor is stopped with a declination at which the torque balances with load. Thus, the motor is caused to make a stepping rotation at each time when the command pulse is applied.

Magnitude of the command current idpn is set so as to make the component on the dp axis correspond to an amplitude of the motor current, and to make another component on the qp axis zero. However, the rotational torque is caused by the q axis component of the command current caused by the angle difference between the rotor angle $\theta 1$ and the command angle $\theta 1+\delta$. Accordingly, it is not necessary to control the q axis component of the current in accordance with the rotor angle or the generated torque. That is, for example, a transformation to transform a command current of a sinusoidal wave form given on the $\alpha$-$\beta$ fixed coordinates system into the d-q rotational coordinates system can be omitted.

Current signals $i\alpha f$, $i\beta f$ in the $\alpha$-$\beta$ fixed coordinates system can be transformed into current signals idf, iqf in the dp-qp rotational coordinates system by an equation (1) as follows;

$$\begin{bmatrix} idf \\ iqf \end{bmatrix} = \begin{bmatrix} \cos\theta & \sin\theta \\ -\sin\theta & \cos\theta \end{bmatrix} \begin{bmatrix} i\alpha f \\ i\beta f \end{bmatrix} \quad (1)$$

where, $\theta$ is an angle between the $\alpha$ axis of the $\alpha$-$\beta$ fixed coordinate system and the dp axis of the dp-qp rotational coordinate system.

Similarly, the current signals idp, iqp in the dp-qp rotational coordinate system can be transformed into the current signals $i\alpha$, $i\beta$ in the $\alpha$-$\beta$ fixed coordinate system by an equation (2) as follows;

$$\begin{bmatrix} i\alpha \\ i\beta \end{bmatrix} = \begin{bmatrix} \cos\theta & -\sin\theta \\ \sin\theta & \cos\theta \end{bmatrix} \begin{bmatrix} idp \\ iqp \end{bmatrix} \quad (2)$$

Figure 3:
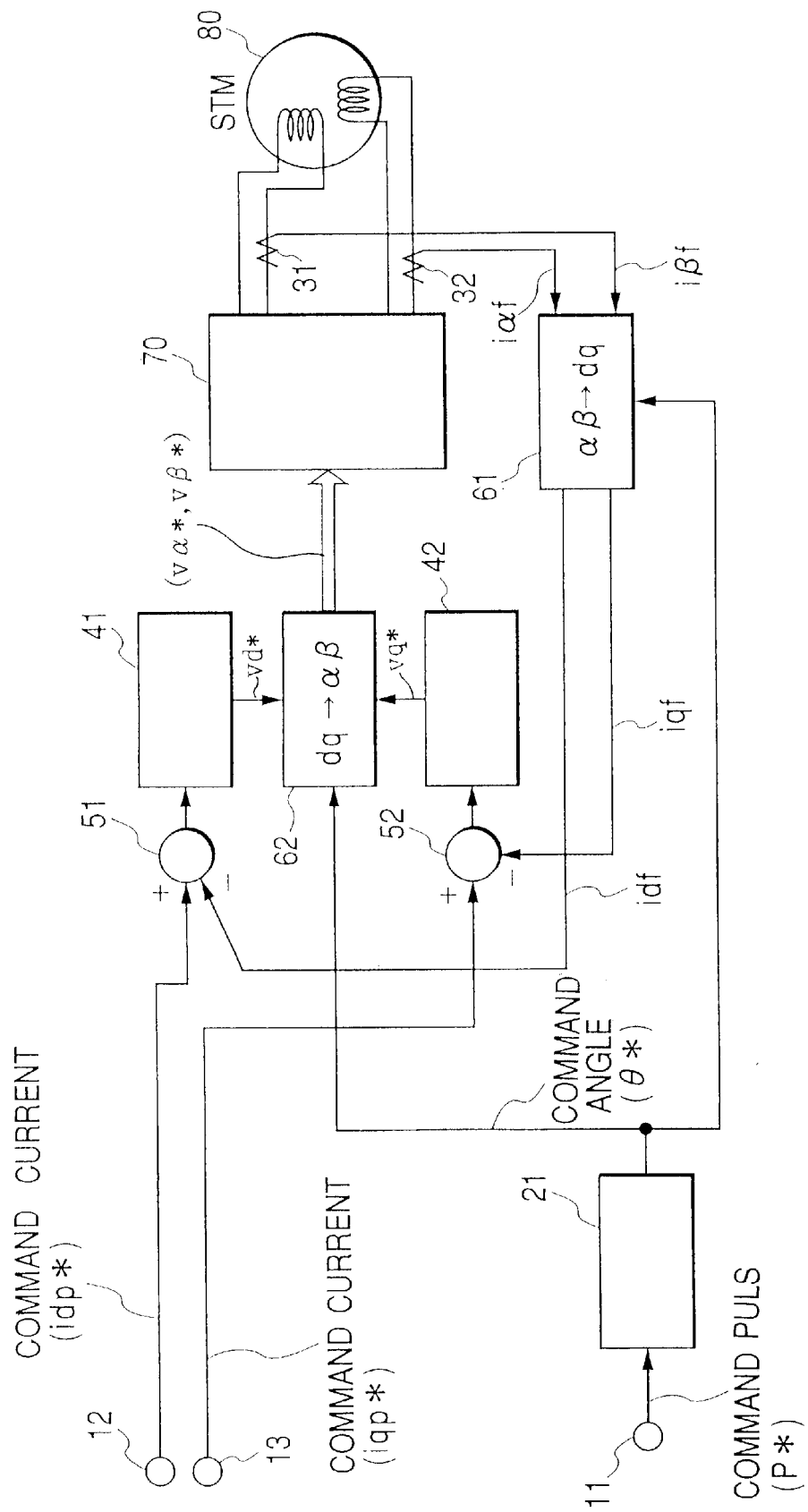
FIG. 3 is a block diagram showing a construction of the first embodiment of the stepping motor controller according to the present invention.

In the first embodiment of the present invention as shown in FIG. 3 that will be explained later, the inverse transformation equation (2) is applied in the second coordinate transformer 62 to transform current signals vd*, vq* in the dp-qp rotational coordinate system into current signals vα*, vβ* in the α-β fixed coordinate system. Accordingly, the inverse transformation equation applied in the second coordinate transformer 62 takes a form as;

$$\begin{bmatrix} v\alpha^* \\ v\beta^* \end{bmatrix} = \begin{bmatrix} \cos\theta & -\sin\theta \\ \sin\theta & \cos\theta \end{bmatrix} \begin{bmatrix} vd^* \\ vq^* \end{bmatrix} \quad (3)$$

Using a rotational angle (θ1+δ) determined by the command pulse as the angle θ in equations (1) and (3), the above operation can be conducted on the dp, qp axes of the dp-qp rotational coordinates system, without using an actual rotational angle θ1 of the rotor.

Figure 5:
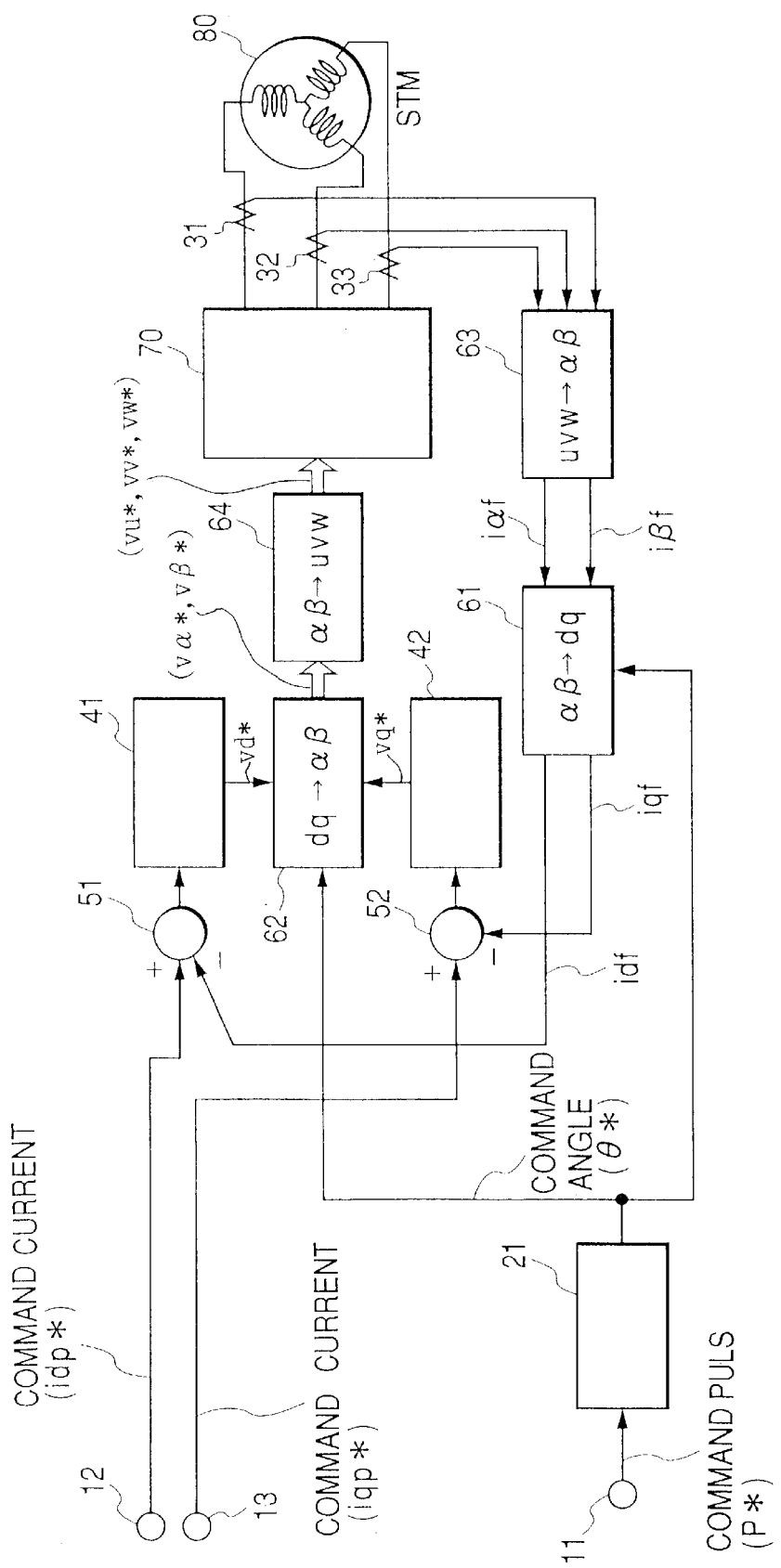
FIG. 5 is a block diagram showing a construction of the second embodiment of the stepping motor controller according to the present invention.

Above explanation is made for a two-phase stepping motor as an example. For a three-phase stepping motor as shown in FIG. 5 that illustrates the second embodiment of the invention and will be explained later, three-phase current signals iuf, ivf, iwf are transformed into current signals iαf, iβf in a two-phase fixed coordinate system by an equation (4) as follows;

$$\begin{bmatrix} i\alpha f \\ i\beta f \end{bmatrix} = \sqrt{2/3} \begin{bmatrix} 1 & -1/2 & -1/2 \\ 0 & \sqrt{3}/2 & -\sqrt{3}/2 \end{bmatrix} \begin{bmatrix} iuf \\ ivf \\ iwf \end{bmatrix} \quad (4)$$

Then, control similar to the case of a two-phase stepping motor is conducted. And then, transformation from the rotational coordinates system into a two-phase fixed coordinates system is made. Finally, current signals vα*, vβ* in the two-phase fixed coordinate system are transformed into three-phase current signals vu*, vv*, vw* by an equation (5) as follows;

$$\begin{bmatrix} vu^* \\ vv^* \\ vw^* \end{bmatrix} = \sqrt{2/3} \begin{bmatrix} 1 & 0 \\ -1/2 & \sqrt{3}/2 \\ -1/2 & -\sqrt{3}/2 \end{bmatrix} \begin{bmatrix} v\alpha^* \\ v\beta^* \end{bmatrix} \quad (5)$$

Thus, the control similar to the control for the two-phase stepping motor can be conducted.

Further, in a micro step drive for a stepping motor of more phases, similar control can also be made by performing coordinate transformation in accordance with the number of phases.

FIG. 3 is a block diagram showing a construction of the first embodiment of the stepping motor controller according to the present invention.

A predetermined voltage is applied from a PWM inverter 70 to a two-phase stepping motor 80 to rotate the stepping motor 80. The PWM inverter 70 contains a current control means for feeding stepped currents to motor windings.

Current sensors 31, 32 detect respective motor phase currents iαf, iβf and transmit them into a first coordinate transformer 61.

An angle calculator 21 receives a command pulse P* at its command pulse input terminal 11 and processes the command pulse P* to output an command angle θ* (corresponds to θ1+δ in FIG. 2).

The first coordinate transformer 61 transforms the motor phase currents iαf, iβf into currents idf, iqf in a rotational coordinates system using the command angle θ* as a rotational angle for the coordinate transformation. Accordingly, the currents idf, iqf are not those values in a d-q rotational coordinates system, where d axis is an axis in the direction of a magnetic flux, but they are values in a dp-qp rotational coordinates system that corresponds to a target position of a rotational coordinates system obtained by further rotating the d-q rotational coordinates system by an angle of δ. (See FIG. 2.)

On the other hand, a command current idp* (corresponds to idpn in FIG. 2) is applied to a dp axis command current input terminal 12 and another command current iqp* is applied to a qp axis command current input terminal 13. Here, the value of the current idp* is set to be a value corresponding to a motor current amplitude and the value of another current iqp* is set to be zero.

A comparator 51 calculates a current error that is a difference between the command current idp* and the feedback current idf, whereas a comparators 52 calculate a current error that is a difference between another command current iqp* and the feedback current iqf. These current errors are amplified respectively by a current compensator 41 or 42, then transformed into values in a α-β fixed coordinates system by a second coordinate transformer 62, and then transmitted into the PWM inverter 70. Rotation angle used in the second coordinate transformer 62 for the coordinate transformation is identical with the command angle θ* used in the first coordinate transformer 61.

Figure 4:
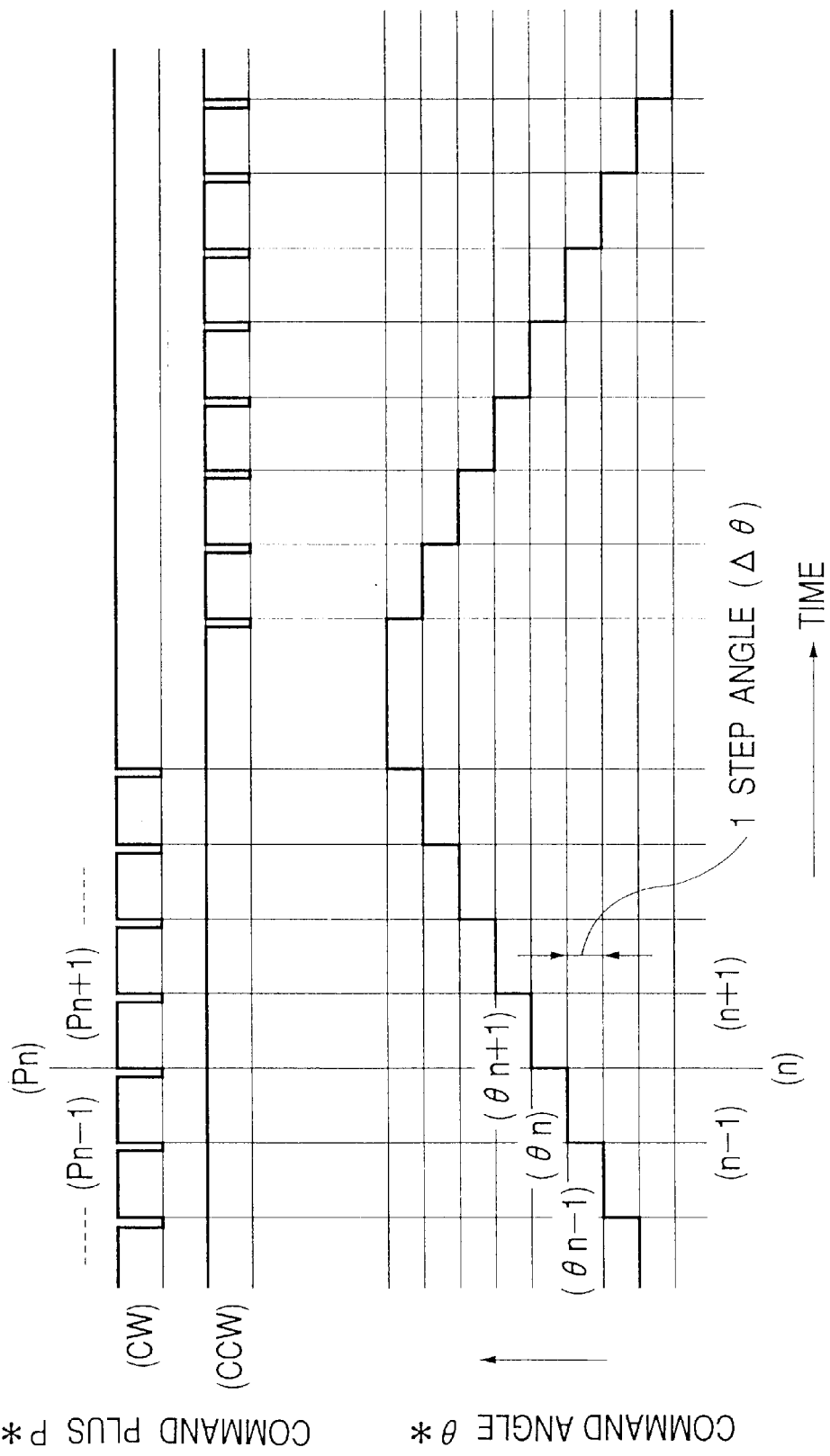
FIG. 4 is a diagram showing a function of an angle calculator according to the present invention.

FIG. 4 is a diagram showing a function of the angle calculator 21. The angle calculator 21 can be composed of an up-down counter, for example. At a start of an initialization of the stepping motor controller, a winding of a certain phase of the motor is excited so as to make axes of the dp-qp rotational coordinates system coincide respectively with axes of the α-β fixed coordinate system. After that, the angle calculator 21 is initialized. Then, the rotational angle of the rotational coordinates system is calculated by increasing or decreasing the command angle θ* of the rotor position at each time when the command pulse P* in CW or CCW direction is given.

The value of the command current idp* corresponds to the motor current amplitude, and the maximum value of the motor current can be controlled by varying magnitude of the command current idp*. So, the motor current can be varied according to the purpose of the motor being used by varying the magnitude of the command current idp*. For example, a power consumption can be economized by reducing the value of the command current idp* when the motor is being stopped.

FIG. 5 is a block diagram showing a construction of the second embodiment of the stepping motor controller according to the present invention.

In this embodiment, a stepping motor to be controlled is a three-phase stepping motor, differing from the first embodiment in which the motor to be controlled is the two-phase stepping motor. In the drawing, the same numerals are affixed to the circuits or parts having same or similar functions to those in FIG. 3. Construction of the stepping motor controller shown in FIG. 5 is same to that shown in FIG. 3 except that the stepping motor 80 is the three-phase stepping motor instead of the two-phase stepping motor, and that a three-phase to two-phase fixed coordinate transformer 63 that transforms a three-phase UVW fixed coordinates system into the two-phase α-β fixed coordinates system, a two-phase to three-phase fixed coordinate transformer 64 that transforms the two-phase α-β fixed coordinates system into the three-phase UVW fixed coordinates system, and a current sensor 33 are added. Additionally, the current sensor 33 for detecting the third phase current can be omitted, since the third phase current can be calculated from the outputs of the first and the second current sensors taking the symmetric property into consideration.

In the first and the second embodiments of the stepping motor controller according to the present invention, the stepping motor controller is composed of a plurality of circuits or parts. Number of the circuits or the parts can be reduced by using a microprocessor in which certain functions of the circuits and/or the parts are carried out.

In the stepping motor controller according to the present invention, the value corresponding to the motor current amplitude is set on the dp axis as the command current, whereas zero current value is set on the qp axis as another command current. As a result, the q axis component of the current value appears due to the angle difference between the rotor angle and the command angle, and a torque is generated. Accordingly, an operation for controlling the q axis current according to the rotor angle or the generated torque is not required. Consequently, the stepping motor controller having a simple construction, low in price and having a micro step drive function with high degree of accuracy can be provided. That is, for example, such transformation in which command currents in sinusoidal wave forms are given on the α-β axes of the α-β fixed coordinates system and transformed into the d-q rotational coordinates system can be omitted, and the construction can be simplified comparing with a conventional micro step driver.

Additionally, it is obvious that the stepping motor controller according to the present invention can be applicable to a multi-phase stepping motor other than two or three-phase stepping motor.

What is claimed is:

1. A stepping motor controller comprising;
   current sensors that detect respective motor currents of corresponding phases,
   an inverter containing a current control means for feeding stepped currents to motor windings,
   a coordinate transformer that transforms said motor currents in a fixed coordinates system detected by said current sensors into currents in a first rotational coordinates system composed of a d axis being in the direction of a magnetic flux direction and a q axis being perpendicular to said d axis,
   an angle calculator that transforms an external command pulse for causing said motor to make a stepping rotation into a command angle,
   wherein a second rotational coordinates system composed of a dp axis and a qp axis being perpendicular to said dp axis is determined from said command angle,
   a command current on said dp axis is set to be a value corresponding to a motor current amplitude,
   another command current on said qp axis is set to be zero,
   said motor current is projected on said dp axis and said qp axis,
   said motor current is controlled so as to make a component of said motor current on said dp axis coincide with said command current on said dp axis and to make a component on said qp axis coincide with said another command current on said qp axis, and
   said motor is caused to make a stepping rotation by rotating said second rotational coordinates system by a predetermined angle at each time when said external command pulse is applied.

2. The stepping motor controller according to claim 1 wherein said stepping motor is a two-phase stepping motor, said fixed coordinates system is a two-phase fixed coordinates system, and said second rotational coordinates system is a two-phase rotational coordinates system.

3. The stepping motor controller according to claim 1 wherein said stepping motor is a three-phase stepping motor, said fixed coordinates system is a three-phase fixed coordinates system, and said second rotational coordinates system is a two-phase rotational coordinates system.

* * * * *